Patented Sept. 13, 1932

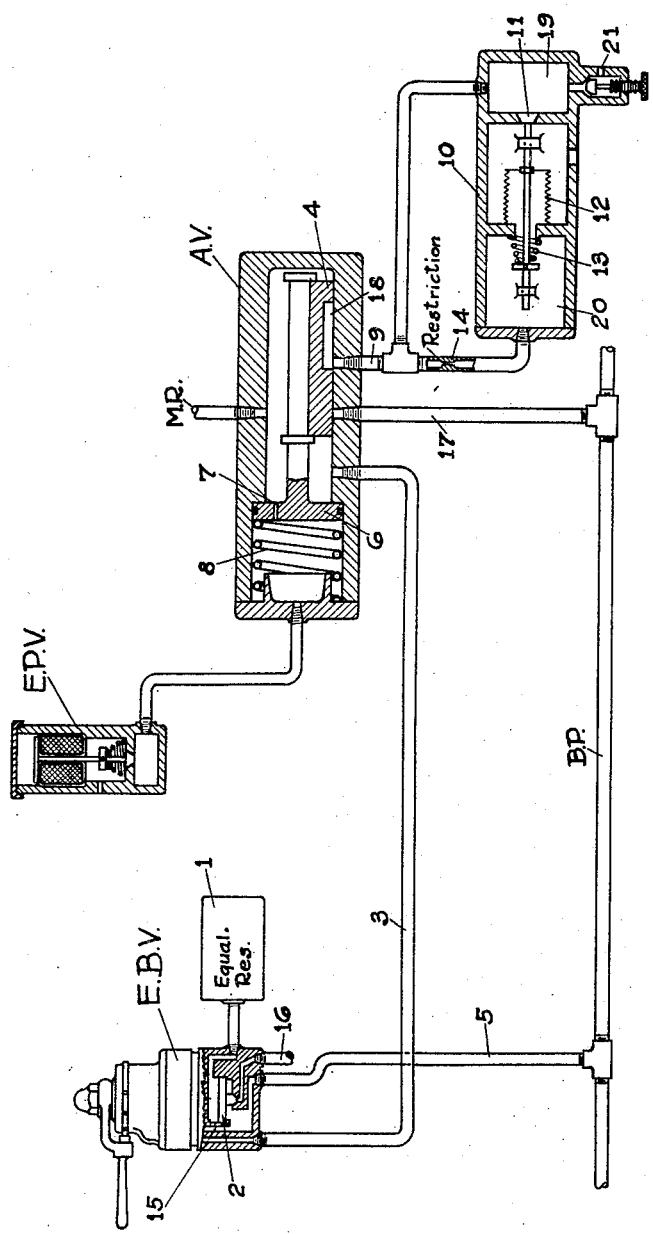

1,877,554

UNITED STATES PATENT OFFICE

CHARLES S. BUSHNELL, OF ROCHESTER, NEW YORK, ASSIGNOR TO GENERAL RAILWAY SIGNAL COMPANY, OF ROCHESTER, NEW YORK

BRAKE APPLYING APPARATUS

Application filed August 27, 1928. Serial No. 302,236.

This invention relates to brake applying apparatus for automatic train control systems, as applied to an air brake system of the normally charged brake pipe type.

Air brake systems of the Westinghouse type in which the brake pipe is normally charged, and in which venting thereof effects a brake application, the brake pipe must not be vented very quickly if it is desired to effect the usual service brake application. If the brake pipe is vented very quickly the triple valves on each of the various cars of the train will go into quick-action and effect an emergency brake application. An emergency brake application is undesirable especially in freight train service, in that, it is apt to cause a break-into or may cause the cars to buckle and thereby cause de-railment of the train. It is of course understood that suitable means might be provided to cause continued gradual reduction in brake pipe pressure, but arrangements of this kind are somewhat cumbersome and rather expensive.

In accordance with the present invention it is proposed to provide means for first venting the brake pipe gradually thus causing the various triple valves to assume the service application position and thereafter vent the brake pipe at a heavier rate, it having been experienced that when the triple valves once have assumed the service application position they will less readily assume the quick-action position even though the brake pipe is thereafter vented at a heavy rate.

Other objects, purposes, and characteristic features of the invention will be understood from a knowledge of the Westinghouse air brake apparatus when considered in connection with the accompanying drawing and the sub-joined description.

In discribing one form of the invention in detail reference will be made to the accompanying drawing in which an application valve of the usual construction has attached to the venting opening thereof a supplemental mechanism, which supplemental mechanism in combination with the remaining apparatus constitutes an embodiment of the present invention.

The usual Westinghouse engineer's brake valve EBV has been shown somewhat conventionally and includes the usual equalizing reservoir 1, and the usual equalizing discharge piston and valve 2. Main reservoir pressure is lead from a main reservoir MR (not shown) to the top of the rotary valve of the engineer's brake valve through the pipe 3, which pipe is cut off of the main reservoir MR by the action of the slide valve 4 of the usual application valve AV when this application valve AV is in its brake applying position. This engineer's brake valve is connected to the brake pipe BP by the pipe 5 in the usual manner.

The application valve AV of the embodiment illustrated includes a cylinder having a piston 6 therein, which piston has a restricted feed opening 7, which opening allows main reservoir pressure to build up on the left side of the piston 6, so that this pressure in addition to the pressure exerted by the spring 8 causes the piston 6 and the valve 4 to assume the extreme right-hand position under the normal energized condition of the electro-pneumatic valve EPV. It readily appears that if the electro-pneumatic valve EPV is de-energized, as by suitable train control apparatus either in response to an excessive speed of the train or a control from the trackway upon its entrance into danger territory, the spring chamber of the application valve AV is vented and the piston 6 is moved to the left.

To the exhaust pipe 9 of the application valve AV is connected a suitable pressure operated valve mechanism 10, whereby the rate of venting from the pipe 9 may at first be restricted and later increased. This valve mechanism 10 includes an adjustable restricted vent 21 having in multiple therewith a valve 11, which is operable by the sylphon 12 in opposition to the compression force of spring 13. The chamber of this sylphon 12 is normally connected to atmosphere through the restricted opening 14 and the restricted opening 21 in series, so that the spring 13 will normally hold the valve 11 closed. It is believed that the functioning of the apparatus is most readily understood by considering the operation of the system.

*Operation.*—It is noted that the brake pipe BP may be charged from the main reservoir MR through the valve chamber of the application valve AV, pipe 3, rotary valve of the engineer's brake valve, port 15 and pipe 5, by operation of the engineer's brake valve to the release or running position, provided the application valve AV is then in its normal position; but that the brake pipe BP may not be so charged if the application valve assumes the left hand position and the slide valve 4 cuts main reservoir pressure off of the pipe 3. It is also understood, by those familiar with the Westinghouse air brake system, that the engineer may vent the equalizing reservoir 1 and thereby cause the equalizing discharge piston and valve 2 to vent the brake pipe BP through pipe 5 and exhaust port 16, until the pressure in the brake pipe and equalizing reservoir are again balanced.

Having now considered the manual operation of the braking equipment let us assume that the electro-pneumatic valve EPV is de-energized by suitable train control apparatus. With the valve EPV de-energized pressure is vented from the left side of the piston 6, thereby causing main reservoir pressure on the right hand side thereof to compress the spring 8 and move the valve 4 to a position to blank the pipe 3 and connect the pipe 17, leading from the brake pipe BP, to the exhaust pipe 9 through cavity 18 in slide valve 4.

By reason of the restriction of vent 21 leading from the chamber 19 brake pipe BP is first vented gradually, thereby causing the various triple valves of the train to assume the service brake applying position. Under the condition just assumed fluid pressure may also flow to the chamber 20 and into the sylphon 12 through the restricted opening 14. After a predetermined period of time sufficient pressure will have been built up in the sylphon 12 to cause the force thereto to overcome that of the compression spring 13, thereby opening the valve 11 and allowing a much greater flow of air from the brake pipe to atmosphere. This additional flow of air will cause an increased brake application without allowing the triple valves to go into quick-action or emergency, the various ports and pressures being so chosen as to obtain the desired result.

Having thus shown and described only one rather specific embodiment of the invention, it is desired to be understood that the particular illustration has been selected for the purpose of facilitating disclosure of the invention, and not for the purpose of illustrating the specific apparatus preferably employed in carrying out the invention, and that certain additions to and deviations from the particular apparatus shown may be made without departing from the spirit or scope of the invention except as demanded by the scope of the following claims.

What I claim is:—

1. In automatic brake applying apparatus, the combination with air brake apparatus for railway systems including a normally charged brake pipe, engineer's brake valve main reservoir, and equalizing reservoir; of a device having a restricted vent port, means for allowing said train pipe to be vented through said vent port, pressure responsive means operated by the back pressure due to fluid pressure flowing through said vent port, and other venting means operated by said pressure responsive means.

2. In automatic brake applying apparatus, the combination with air brake apparatus for railway systems including a normally charged brake pipe, engineer's brake valve main reservoir, and equalizing reservoir; of means automatically operated in accordance with traffic conditions for connecting said brake pipe to a vent port and simultaneously therewith cutting main reservoir pressure off of the engineer's brake valve, and means connected to said vent port for first restricting the flow of fluid pressure from said vent port and thereafter allowing substantially free flow of such fluid pressure.

3. In automatic brake applying apparatus, the combination with air brake apparatus for railway systems including a normally charged brake pipe, engineer's brake valve main reservoir, and equalizing reservoir; of means automatically operated in accordance with traffic conditions for connecting said brake pipe to a vent port and simultaneously therewith cutting main reservoir pressure off of the engineer's brake valve, and means connected to said vent port for first restricting the flow of fluid pressure from said vent port and a predetermined time thereafter allowing substantially free flow of such fluid pressure.

4. In automatic brake applying apparatus, the combination with air brake apparatus for railway systems including a normally charged brake pipe, engineer's brake valve main reservoir, and equalizing reservoir; of means automatically operated in accordance with traffic conditions for connecting said brake pipe to a vent port and simultaneously therewith cutting main reservoir pressure off of the engineer's brake valve, and means connected to said vent port and controlled by the fluid pressure flowing therefrom for first restricting the flow of fluid pressure from said vent port and thereafter allowing substantially free flow of such fluid pressure.

5. In automatic brake applying apparatus, the combination with air brake apparatus for railway systems including a normally charged brake pipe, engineer's brake valve main reservoir, and equalizing reservoir; of means automatically operated in accordance with traffic conditions for connecting said brake pipe to a vent port and simultaneously therewith cutting main reservoir pressure off of the engineer's brake valve, and means connected to said vent port and controlled by the fluid pressure flowing therefrom for first restricting the flow of fluid pressure from said vent port and a predetermined time thereafter allowing substantially free flow of such fluid pressure.

In testimony whereof I affix my signature.

CHARLES S. BUSHNELL.